United States Patent
Tanaka et al.

(10) Patent No.: US 7,166,220 B2
(45) Date of Patent: Jan. 23, 2007

(54) SYSTEMS AND METHODS FOR ORGANIC WASTEWATER TREATMENT

(75) Inventors: Toshihiro Tanaka, Kanagawa (JP); Yosei Katsu, Kanagawa (JP); Satoshi Konishi, Kanagawa (JP)

(73) Assignee: Ebara Corporation, Tokyo (JP)

( * ) Notice: Subject to any disclaimer, the term of this patent is extended or adjusted under 35 U.S.C. 154(b) by 78 days.

(21) Appl. No.: 10/484,776

(22) PCT Filed: Nov. 21, 2002

(86) PCT No.: PCT/JP02/12166

§ 371 (c)(1),
(2), (4) Date: Jul. 19, 2004

(87) PCT Pub. No.: WO03/043941

PCT Pub. Date: May 30, 2003

(65) Prior Publication Data

US 2004/0238441 A1    Dec. 2, 2004

(30) Foreign Application Priority Data

Nov. 22, 2001   (JP) ............................. 2001-357837

(51) Int. Cl.
    *C02F 3/30*       (2006.01)
(52) U.S. Cl. ................ 210/605; 210/609; 210/623; 210/903; 210/259
(58) Field of Classification Search ............. 210/252, 210/259, 605, 609, 615–617, 620, 623, 630, 210/903
    See application file for complete search history.

(56) References Cited

U.S. PATENT DOCUMENTS

| | | | | |
|---|---|---|---|---|
| 3,964,998 A | * | 6/1976 | Barnard | 210/605 |
| 5,650,069 A | * | 7/1997 | Hong et al. | 210/605 |
| 6,007,712 A | * | 12/1999 | Tanaka et al. | 210/151 |
| 6,517,723 B1 | * | 2/2003 | Daigger et al. | 210/605 |
| 6,824,685 B1 | * | 11/2004 | Katsu et al. | 210/626 |
| 6,863,818 B1 | * | 3/2005 | Daigger et al. | 210/616 |
| 2003/0121852 A1 | * | 7/2003 | Katsu et al. | 210/609 |
| 2004/0188361 A1 | * | 9/2004 | Katsu et al. | 210/791 |

FOREIGN PATENT DOCUMENTS

| | | | |
|---|---|---|---|
| DE | 3934958 | * | 4/1991 |
| JP | 50-147157 | * | 11/1975 |
| JP | 55-73398 | * | 6/1980 |
| JP | 57-177395 | | 11/1982 |
| JP | 60-28894 | * | 2/1985 |

(Continued)

*Primary Examiner*—Fred G. Prince
(74) *Attorney, Agent, or Firm*—Wenderoth, Lind & Ponack, L.L.P.

(57) ABSTRACT

A system and method for organic wastewater treatment through denitrification and nitrification processes. The system for treating organic wastewater includes a multistage treatment tank having at least two stages in series. Each stage has a denitrification tank and a nitrification tank connected in this order. The system includes a pipe for distributing feed water to the denitrification tank in each stage, a device for filtering and separating at least a part of an activated sludge mixed liquor present in at least one nitrification tank, and a pipe for supplying at least a part of the concentrated sludge mixed liquor obtained by the filtration and separation treatment to the denitrification tank.

18 Claims, 5 Drawing Sheets

FOREIGN PATENT DOCUMENTS

| | | | |
|---|---|---|---|
| JP | 2-214596 | | 8/1990 |
| JP | 7-116692 | * | 5/1995 |
| JP | 10-128369 | | 5/1998 |
| JP | 10-128393 | | 5/1998 |
| JP | 11-165191 | * | 6/1999 |

* cited by examiner

SYSTEMS AND METHODS FOR ORGANIC WASTEWATER TREATMENT

TECHNICAL FIELD

The present invention relates to wastewater treatment. More specifically, it relates to a system and method for treating organic wastewater, including organic industrial wastewater and domestic wastewater, by means of an activated sludge process to denitrify and nitrify the wastewater.

BACKGROUND ART

In conventional water treatment using activated sludge, solid-liquid separation of the activated sludge mixed liquor has been required to obtain clean treated water. To this end, it is common to use a strategy in which an activated sludge mixed liquor is introduced into a sedimentation tank to thereby deposit the sludge by the action of gravity, while the supernatant is discharged as treated water from the sedimentation tank. In this case, the sedimentation tank is required to have a settling area large enough and a retention time long enough to deposit activated sludge, thus causing increases in the size and setting volume of the entire treatment system. Moreover, in a case where activated sludge is difficult to deposit by reason of bulking or other causes, the sludge overflows from the sedimentation tank, which leads to reduced quality of the treated water.

In biological nitrogen removal through denitrification and nitrification processes, the nitrified fluid is circulated from nitrification tank to denitrification tank, whereby $NO_x$—N (nitrate nitrogen and nitrite nitrogen) in the nitrified fluid is reduced to a nitrogen gas by the action of denitrifying bacteria present in activated sludge. During this step, a BOD source in raw feed water is used as a hydrogen donor for denitrification. In such a denitrification/nitrification process, the circulating volume from the nitrification tank to the denitrification tank should be increased to achieve high removal of nitrogen. However, when the circulating volume from the nitrification tank is increased for sludge rich in dissolved oxygen, a further problem arises because the introduction of dissolved oxygen causes a reduction in denitrification performance of the denitrification tank to be used under anaerobic conditions.

On the other hand, a strategy using membrane separation instead of a sedimentation tank is conventionally used to conduct solid-liquid separation of activated sludge. In this case, it is common to use a microfiltration membrane or an ultrafiltration membrane as a membrane for solid-liquid separation. However, this strategy requires a suction/pressure pump as a filtration and separation means. Since filtration is usually accomplished under a pressure ranging from several tens of kPa to several hundreds of kPa, a high pump power is required and leads to an increase in running costs. Membrane separation enables the provision of clear treated water completely free from SS, but permeation flux is low, and it requires periodic chemical washing of the membrane in order to prevent membrane pollution.

In recent years, as an alternative to using a sedimentation tank, another strategy for solid-liquid separation of an activated sludge mixed liquor has been proposed in which a filter material composed of a water-permeable sheet such as woven or nonwoven fabrics, or metallic net materials is immersed in an aeration tank to form a secondary deposition layer of sludge particles per se on the surface of the filter, which is then used as a filtration layer to obtain clear filtered water at low hydraulic head pressure. This strategy is called "dynamic filtration." Such a filter material composed of a water-permeable sheet allows sludge particles to pass through itself, while a cross-flow of the activated sludge mixed liquor generated on the filter surface causes the formation of a secondary deposition layer of sludge flocs on the water-permeable sheet. This sludge layer serves as a filtration layer (i.e., a dynamic filtration layer) so as to achieve solid-liquid separation of sludge and SS contained in feed water. Since the thickness of such a dynamic filtration layer increases over the course of filtration time, the thickened layer results in increased filtration resistance and hence reduced filtration flux. In such a case, aeration is performed through an air-diffusing pipe provided below the filter to remove the dynamic filtration layer of sludge formed on the filter surface, followed by formation of a new dynamic filtration layer to ensure stable filtration flux.

In applying this dynamic filtration technique to the denitrification/nitrification process, there are two possible embodiments, one of which employs a dynamic filter module placed in a nitrification tank, and the other of which employs a dynamic filter module placed in a solid-liquid separation tank provided separately from denitrification and nitrification tanks. However, in both embodiments, the circulating volume from the nitrification tank to the denitrification tank should be increased to achieve high removal of nitrogen; and hence, as in the case of conventional treatment, a further problem arises because the introduction of a nitrified fluid rich in dissolved oxygen causes a reduction in denitrification performance of the denitrification tank.

The present invention overcomes mutually contradictory problems associated with a system for organic wastewater treatment through denitrification and nitrification processes, as stated above, to the effect that when the circulating volume from the nitrification tank to the denitrification tank is increased to achieve high removal of nitrogen, the introduction of a nitrified fluid rich in dissolved oxygen causes a reduction in denitrification performance of the denitrification tank. Thus, the object of the present invention is to provide a system and method for organic wastewater treatment through denitrification and nitrification processes, which system and method achieve high removal of nitrogen without reducing the denitrification performance of denitrification tanks.

SUMMARY OF THE INVENTION

The present invention provides the following means to overcome the above problems.

1. A system for treating organic wastewater, which comprises a multistage treatment tank having at least two stages in series, each stage comprising a denitrification tank and a nitrification tank connected in this order,
   wherein said system comprises a pipe for distributing feed water to the denitrification tank in each stage, a means for filtering and separating at least a part of an activated sludge mixed liquor in at least one nitrification tank, and a pipe for supplying at least a part of the concentrated sludge mixed liquor obtained by said filtration and separation treatment to the denitrification tank.

2. The system for treating organic wastewater according to 1 above, wherein the filtration and separation means is placed in the nitrification tank, and at least a part of the concentrated sludge mixed liquor obtained by filtration and separation treatment in the nitrification tank is supplied to the denitrification tank(s).

3. The system for treating organic wastewater according to 1 above, which further comprises a solid-liquid separation tank, wherein the filtration and separation means is placed in the solid-liquid separation tank, and at least a part of the concentrated sludge mixed liquor obtained by filtration and separation treatment in the solid-liquid separation tank is supplied to the denitrification tank.

4. The system for treating organic wastewater according to any one of 1 to 3 above, wherein the filtration and separation means is a dynamic filter comprising a water-permeable filtration layer support material for forming a dynamic filtration layer of activated sludge particles thereon.

5. The system for treating organic wastewater according to 4 above, wherein the water-permeable filtration layer support material is composed of at least one member selected from the group consisting of a woven fabric material, a nonwoven fabric material and a metallic net material.

6. The system for treating organic wastewater according to any one of 1 to 5 above, which further comprises a sedimentation tank to be used for solid-liquid separation of at least a part of the activated sludge mixed liquor introduced from the nitrification tank in the final stage, as well as a pipe for returning at least a part of the deposited sludge collected from the sedimentation tank to the denitrification tank in the first stage.

7. The system for treating organic wastewater according to any one of 1 to 6 above, which further comprises an anaerobic tank connected upstream of the denitrification tank in the first stage, and a pipe for distributing feed water connected to the anaerobic tank.

8. The system for treating organic wastewater according to any one of 1 to 7 above, wherein the denitrification and nitrification tanks are at least partially filled with a carrier capable of holding living bacterial cells.

9. A method for treating organic wastewater in an organic wastewater treatment system comprising a multistage treatment tank having at least two stages in series, each stage comprising a denitrification tank and a nitrification tank connected in this order, said method comprising:

distributing feed water to the denitrification tank in each stage;

filtering and separating at least a part of an activated sludge mixed liquor present in at least one nitrification tank, and;

supplying at least a part of the concentrated sludge mixed liquor obtained by said filtration and separation treatment to the denitrification tank.

10. The method according to 9 above, wherein the filtration and separation treatment is accomplished with a filtration and separation means placed in the nitrification tank(s), and at least a part of the concentrated sludge mixed liquor obtained by filtration and separation treatment in the nitrification tank is supplied to the denitrification tank.

11. The method according to 9 above wherein the filtration and separation treatment of the activated sludge mixed liquor is accomplished by supplying at least a part of the activated sludge mixed liquor present in at least one nitrification tank to a solid-liquid separation tank having a filtration and separation means placed therein, and at least a part of the concentrated sludge mixed liquor obtained by filtration and separation treatment in the solid-liquid separation tank is supplied to the denitrification tank.

12. The method according to any one of 9 to 11 above, wherein the filtration and separation means is a dynamic filter comprising a water-permeable filtration layer support material for forming a dynamic filtration layer of activated sludge particles thereon.

13. The method according to 12 above, wherein the water-permeable filtration layer support material is composed of at least one member selected from the group consisting of a woven fabric material, a nonwoven fabric material and a metallic net material.

14. The method according to any one of 9 to 13 above, wherein at least a part of the activated sludge mixed liquor present in the nitrification tank in the final stage is introduced into a sedimentation tank and subjected to solid-liquid separation, and at least a part of the deposited sludge collected from the sedimentation tank is returned to the denitrification tank in the first stage.

15. The method according to any one of 9 to 14 above, wherein an anaerobic tank is further connected upstream of the denitrification tank in the first stage, and feed water is also distributed to the anaerobic tank.

16. The method according to any one of 9 to 15 above, wherein the denitrification and nitrification tanks are at least partially filled with a carrier capable of holding living bacterial cells.

According to the present invention, in treating organic wastewater in an organic wastewater treatment system comprising a multistage treatment tank having at least two stages in series, each stage comprising a denitrification tank and a nitrification tank connected in this order, the sludge concentration in the denitrification tanks can be maintained at a high level by distributing feed water to the denitrification tank in each stage and supplying an activated sludge mixed liquor in the nitrification tank to the denitrification tank after being concentrated by filtration and separation. In addition to this, it is possible to achieve a significantly reduced level of $NO_x$—N in treated water and improved removal of T-N (total nitrogen) by supplying $NO_x$—N in the nitrified fluid to the denitrification tank and reducing it to $N_2$ by the action of denitrifying bacteria present in the denitrification tank. Moreover, since the concentrated sludge mixed liquor is obtained by filtration and separation of the sludge mixed liquor to remove treated water before being supplied to the denitrification tank, the concentrated sludge mixed liquor supplied to the denitrification tank has an extremely low level of dissolved oxygen. Even if this sludge mixed liquor is returned to the denitrification tank, the risk of reduced denitrification performance due to dissolved oxygen is very small.

A filtration and separation means available for use in filtration and separation treatment may be any conventionally known immersion-type membrane separator. In a preferred embodiment of the present invention, filtered water can be stably obtained at low hydraulic head pressure by using what is called a "dynamic filter module" as a means for filtering and separating the sludge mixed liquor in the nitrification tank. For example, such a filtration and separation means may be immersed in the nitrification tank.

Alternatively, in another embodiment of the present invention, such a filtration and separation means as mentioned above may be immersed in a solid-liquid separation tank provided separately. The solid-liquid separation tank may be equipped with a pipe for supplying an activated sludge mixed liquor in the nitrification tank to the solid-liquid separation tank. After filtration and separation of the activated sludge mixed liquor in the solid-liquid separation tank, the resulting concentrated sludge mixed liquor may be supplied to the denitrification tank.

In particular, when using a dynamic filter as a filtration and separation means, dynamic filtration is preferably accomplished in a solid-liquid separation tank provided as stated above. In this case, an activated sludge mixed liquor to be introduced is preferably kept as free from aeration bubbles as possible. In contrast, when a dynamic filter is immersed in the nitrification tank, it is necessary to form a downward cross-flow on the filter surface with the aid of spiral flow generated by aeration; and hence water flow on the filter surface may be considerably nonuniform because it is significantly affected by the position and distance of an aeration pipe relative to the filter. Since a nonuniform flow of the sludge mixed liquor on the filter surface makes it impossible to ensure a uniform thickness of the dynamic filtration layer formed on the surface, it is difficult to maintain a stable volume of filtered water. Also, when a dynamic filter is placed in the nitrification tank (aeration tank), a dynamic filtration layer will be formed in the presence of aeration bubbles. However, under such conditions, the formed dynamic filtration layer is easy to flake off by the action of aeration bubbles, and it may be difficult to maintain the quality of filtered water. Because the water level in the nitrification tank will vary depending on the volume of feed water and aeration, the water head difference between the nitrification tank and its downstream tank is also variable and hence results in unstable filtration pressure. This not only causes variations in the volume of filtered water, but also adversely affects the filtration performance of the sludge filtration layer formed on the filter surface. However, when a dynamic filter is immersed in a solid-liquid separation tank provided separately from the multi-stage structure of denitrification and nitrification tanks, and an activated sludge mixed liquor in the nitrification tank is supplied to the solid-liquid separation tank where the activated sludge mixed liquor is filtered and separated by dynamic filtration, treated water of good quality can be stably obtained with a constant volume of filtered water even if there are variations in the volume and quality of raw feed water and changes in the properties of activated sludge particles. In such a case where a solid-liquid separation tank is provided separately, the level of dissolved oxygen in the solid-liquid separation tank is lower at a position closer to the outlet because the solid-liquid separation tank receives only the sludge mixed liquor supplied from the nitrification tank while discharging treated water. Namely, the concentrated sludge mixed liquor discharged from the solid-liquid separation tank is almost free from dissolved oxygen and poses no risk of reduced denitrification performance due to dissolved oxygen even if the mixed liquor is returned to the denitrification tank.

The filtration and separation treatment may be performed in the nitrification tank in each stage and the resulting concentrated activated sludge mixed liquor may then be returned to the corresponding denitrification tank in the same stage. This enables the supply of the concentrated activated sludge mixed liquor to the denitrification tank in each stage, thereby making it possible to maintain a high level of MLSS (mixed liquor suspended solids) in the denitrification and nitrification tanks and to ensure high removal of nitrogen. Moreover, the nitrified fluid from an upstream nitrification tank (e.g., tank 1C in FIG. 1 explained below) is efficiently denitrified in its downstream denitrification tank (tank 2B in FIG. 1) with the aid of raw water supplied thereto. Alternatively, in another embodiment of the present invention, the filtration and separation treatment may be performed in some of the nitrification tanks, in particular, exclusively in a downstream nitrification tank(s). For example, the filtration and separation treatment may be performed exclusively on the activated sludge mixed liquor in the nitrification tank in the final stage and the resulting concentrated sludge mixed liquor may then be returned to any upstream denitrification tank.

In yet another embodiment of the present invention, a sedimentation tank may be further provided downstream of the nitrification tank in the final stage of the multiple denitrification and nitrification tanks connected in series. At least a part of the activated sludge mixed liquor in the final stage may be introduced into the sedimentation tank and subjected to solid-liquid separation. Such a configuration ensures final solid-liquid separation in the sedimentation tank even if variations in the volume and quality of raw water lead to a reduction in the volume of filtered water obtained in each stage. In addition, it is possible to maintain a higher level of MLSS in the denitrification tanks and to achieve higher denitrification performance if at least a part of the deposited sludge obtained in the sedimentation tank is returned to the denitrification tank in the first stage.

The denitrification and nitrification tanks in each stage are designed to ensure that the filtered water obtained by filtration and separation of the nitrified fluid from the nitrification tank can be discharged as treated water from the system. Thus, they are significantly advantageous in maintaining a high level of MLSS in the tanks, in ensuring high removal of nitrogen, and in treating a larger volume of water.

A water-permeable filtration layer support material to be used in the dynamic filter to form a dynamic filtration layer may be any of a woven fabric, a nonwoven fabric, a metallic net or the like, all of which produce the same results. In the case of using a woven fabric or a metallic net, those having a pore size of 50 to 200 μm are suitable for this purpose. The filter is primarily designed to have a planar shape, but may also be designed to have a cylindrical or hollow shape. Two or more filters may be bundled together into a module filter.

In a case where raw water to be treated has a high phosphorus content and hence requires biological phosphorus removal, an anaerobic tank may be newly provided upstream of the denitrification tank in the first stage, and return sludge may be supplied to the anaerobic tank together with a part of feed water. This allows selective growth of polyphosphate-accumulating organisms (PAO) in the anaerobic tank and uptake of phosphorus contained in raw water by PAO in the nitrification tanks, thereby also achieving removal of phosphorus contained in raw water. If a sedimentation tank is provided downstream of the nitrification tank in the final stage in this embodiment, the deposited sludge collected from the sedimentation tank may be returned to the anaerobic tank. Alternatively, if the sludge is not returned from the final stage of the treatment tank, at least a part of the sludge mixed liquor in the denitrification tank in the first stage may be returned to the anaerobic tank.

Such an anaerobic tank provided for the purpose of removing phosphorus is intended to mean a reaction tank free from DO (dissolved oxygen) and $NO_x$—N. The use of such a tank allows preferential growth of polyphosphate-accumulating organisms throughout the entire system for biological treatment. As a result, phosphorus contained in raw water is captured as polyphosphate by polyphosphate-accumulating organisms.

Further, in the present invention, the denitrification and nitrification tanks in each stage are at least partially filled with a carrier capable of holding living bacterial cells. When filled into the denitrification and/or nitrification tanks, such a carrier is advantageous in reducing the retention time and the tank volume. Examples of a carrier available for this purpose include polymer particles (particle size: 2 to 4 mm) or sponge materials made of PEG (polyethylene glycol), PVA (polyvinyl alcohol), etc.

DETAILED DESCRIPTION OF THE INVENTION

Detailed explanations will be given for various possible embodiments of the present invention by reference to the accompanying drawings.

Figure 1:
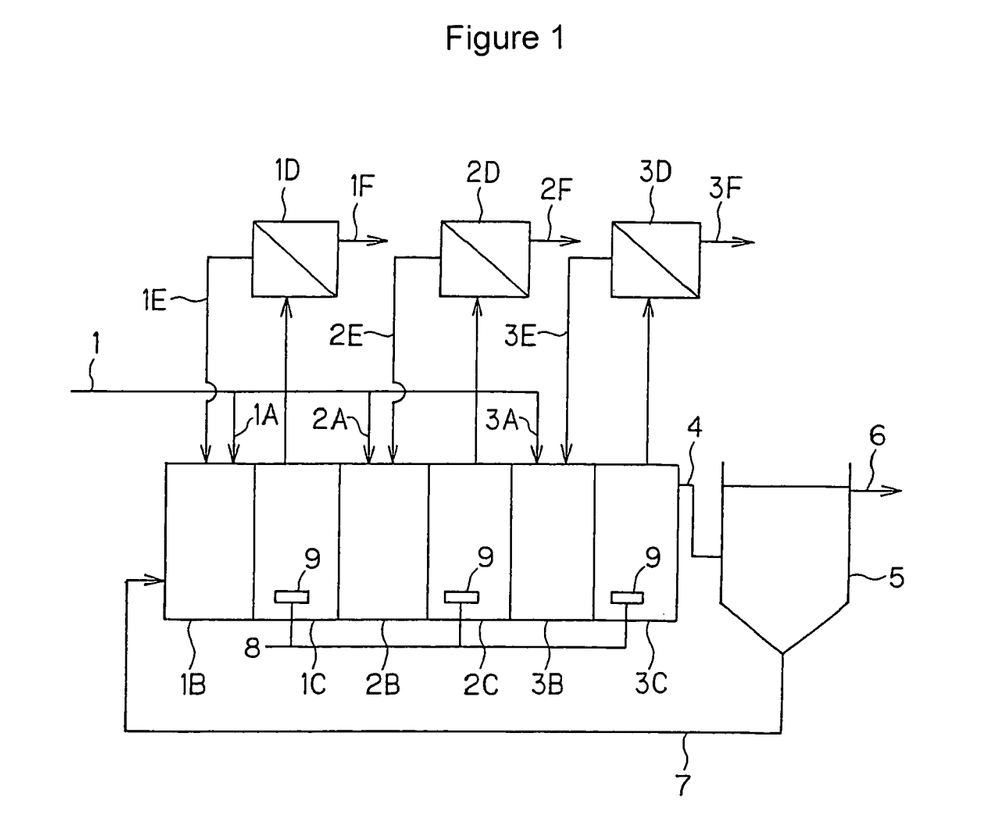
FIG. 1 is a conceptual illustration of a system for organic wastewater treatment according to one embodiment of the present invention.

FIG. 1 is a flow sheet showing an example of raw water treatment using a system for organic wastewater treatment according to one embodiment of the present invention.

The system for organic wastewater treatment shown in FIG. 1 comprises a treatment tank having multiple stages in series, each stage comprising denitrification (B) and nitrification (C) tanks connected in this order. In FIG. 1, three sets of denitrification and nitrification tanks are connected in series and in fluid communication with each other to give the multistage structure of 1B-1C-2B-2C-3B-3C. In this treatment system, raw feed water 1 is divided into three lines 1A, 2A and 3A, which are distributed to a first denitrification tank 1B, a second denitrification tank 2B and a third denitrification tank 3B, respectively. This allows the use of organic matter in the raw water as a hydrogen donor for denitrification and facilitates denitrification under anaerobic conditions. The effluent from the first denitrification tank 1B enters its downstream first nitrification tank 1C, where $NH_4$—N (ammonia nitrogen) is nitrified. Each nitrification tank is equipped with an air diffuser 9 connected to an air supply pipe 8, through which aeration is accomplished to maintain the tank under an aerobic atmosphere. The nitrified fluid (activated sludge mixed liquor) from the first nitrification tank 1C is supplied to a first solid-liquid separation tank 1D and then filtered through a filter module placed in the solid-liquid separation tank 1D to give first filtered water 1F. It should be noted that the volume of filtered water is adjusted to not more than that of raw feed water. The concentrated sludge mixed liquor remaining after filtration is circulated as first circulating sludge 1E and enters the first denitrification tank 1B, where $NO_x$—N is denitrified. A part of the nitrified fluid from the first nitrification tank 1C is also delivered to its downstream second denitrification tank 2B.

The above also applies to the second denitrification and nitrification tanks 2B and 2C. The sludge mixed liquor in the nitrification tank is supplied to a second solid-liquid separation tank 2D to give filtered water 2F. The concentrated sludge mixed liquor remaining after filtration is circulated as circulating sludge 2E and enters the second denitrification tank 2B, where $NO_x$—N in the nitrified fluid is denitrified. This also applies to the third denitrification and nitrification tanks 3B and 3C. The nitrified fluid is supplied to a solid-liquid separation tank 3D and subjected to filtration. The resulting concentrated sludge mixed liquor is circulated as circulating sludge 3E and enters the third denitrification tank 3B.

It should be noted that the volume of filtered water obtained from the first to third solid-liquid separation tanks is adjusted to not more than that of raw feed water. In the system shown in FIG. 1. effluent 4 from the third nitrification tank 3C (final stage in the system shown in FIG. 1) enters the downstream sedimentation tank 5. After deposition and concentration, the resulting supernatant is obtained as treated water 6. The deposited sludge (concentrated sludge) collected from sedimentation tank 5 is returned to the first denitrification tank 1B as return sludge 7.

The filtration and separation means to be placed in the solid-liquid separation tank may be any immersion-type membrane separator known in the art. Alternatively, what is called a "dynamic filter module" may also be used for this purpose. The use of a dynamic filter module enables a stable provision of filtered water at low hydraulic head pressure. In a case where such a dynamic filter module is placed in the solid-liquid separation tank, there is no particular need to use a means for generating a cross-flow of the sludge mixed liquor along the surface of a filtration layer support material in the solid-liquid separation tank. That is, the flow rate of circulating sludge through the separation tank is sufficient to form a dynamic filtration layer. When the dynamic filter module is placed in the solid-liquid separation tank, it is preferable to equip the solid-liquid separation tank together with an air-diffusing pipe for air washing the dynamic filter.

Although FIG. 1 illustrates a configuration where the sedimentation tank 5 is placed downstream of the final nitrification tank, it is also possible to not place the sedimentation tank 5 downstream of the final nitrification tank. In this case, the filtered water obtained from the final solid-liquid separation tank is collected as treated water. It should be noted that when the sedimentation tank 5 is not placed, the total volume of filtered water from each solid-liquid separation tank is adjusted to the same level as that of raw feed water.

Filtration operation may be conducted in one or two of the solid-liquid separation tanks depending on the volume and quality of raw feed water and the quality of treated water; or, the circulating sludge 3E from the third solid-liquid separation tank 3D may be circulated to the first or second denitrification tank 1B or 2B. If higher removal of nitrogen is required, the circulating sludge from the third solid-liquid separation tank. 3D is desirably circulated to the first denitrification tank 1B.

Figure 2:
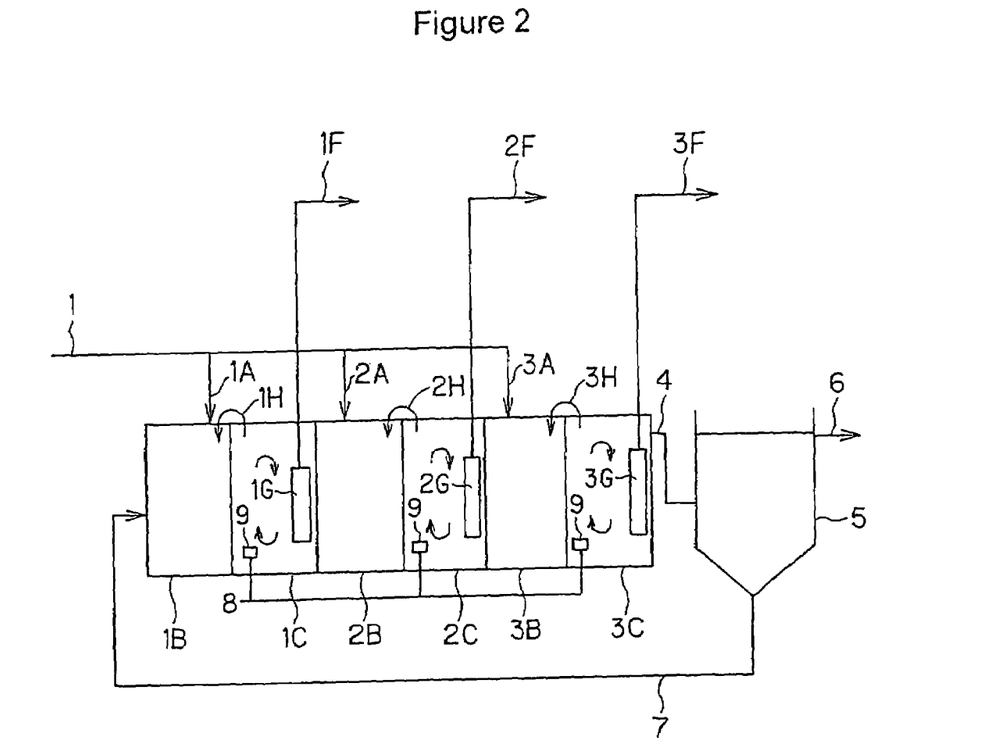
FIG. 2 is a conceptual illustration of a system for organic wastewater treatment according to another embodiment of the present invention.

To illustrate another embodiment of the present invention, FIG. 2 shows a configuration example of a system for organic wastewater treatment wherein filtration and separation means is immersed in the nitrification tank. In the system for organic wastewater treatment shown in FIG. 2, filtration and separation means 1G, 2G and 3G are immersed in a first nitrification tank 1C, a second nitrification tank 2C and a third nitrification tank 3C, respectively. All other elements are the same as shown in FIG. 1. Filtered water (1F, 2F, 3F) is obtained by the filtration and separation means immersed in each nitrification tank. In addition, the concentrated sludge mixed liquor remaining after filtration is returned from each nitrification tank to the corresponding denitrification tank in the same stage (1H, 2H, 3H). The filtration and separation means to be immersed in each nitrification tank may be any conventionally known immersion-type membrane separator. Alternatively, what is called a "dynamic filter module" may also be used for this purpose. In a case where such a dynamic filter module is used, the module is preferably placed apart from an air diffuser 9 to be placed in each nitrification tank, such that a downward cross-flow is formed along the surface of the dynamic filter module with the aid of aeration generated by the air diffuser. Such a configuration allows stable formation of a dynamic filtration layer without the risk of flaking off the formed dynamic filtration layer by aeration.

Moreover, the filtered water obtained through the dynamic filter module may also be supplied to an additional sedimentation tank and, in turn, the resulting supernatant may be collected as treated water when the dynamic filter module is used as a filtration and separation means.

Figure 3:
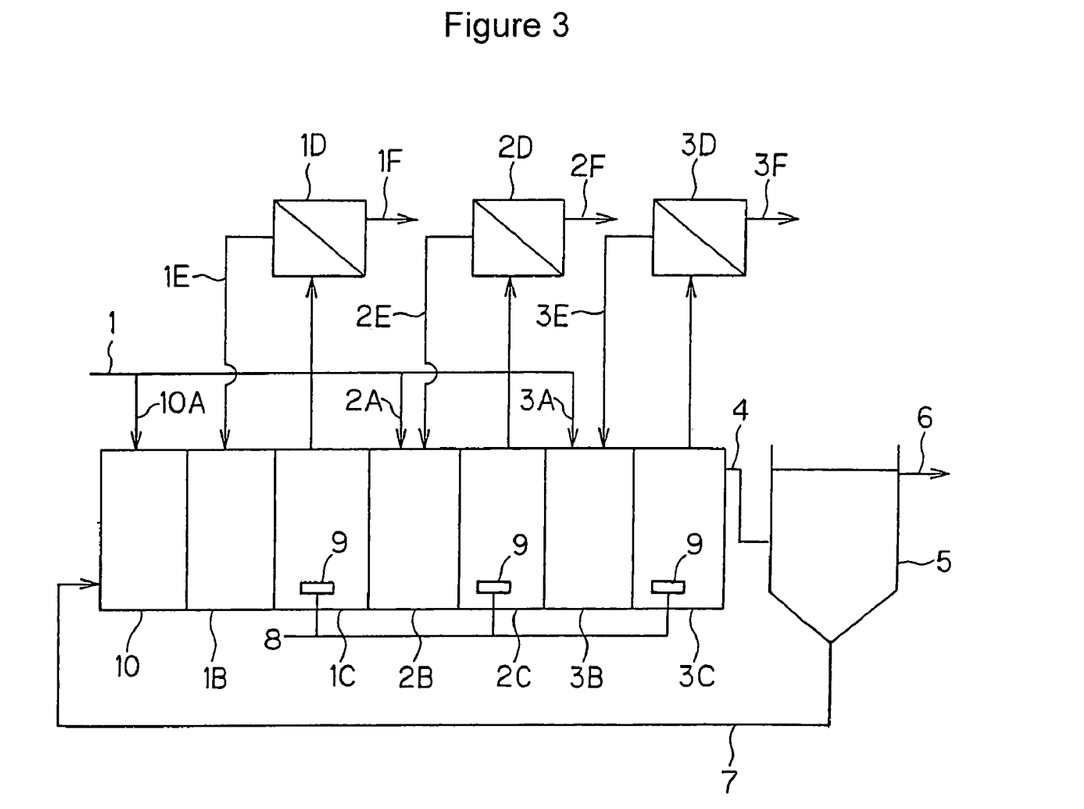
FIG. 3 is a conceptual illustration of a system for organic wastewater treatment according to yet another embodiment of the present invention.
Figure 4:
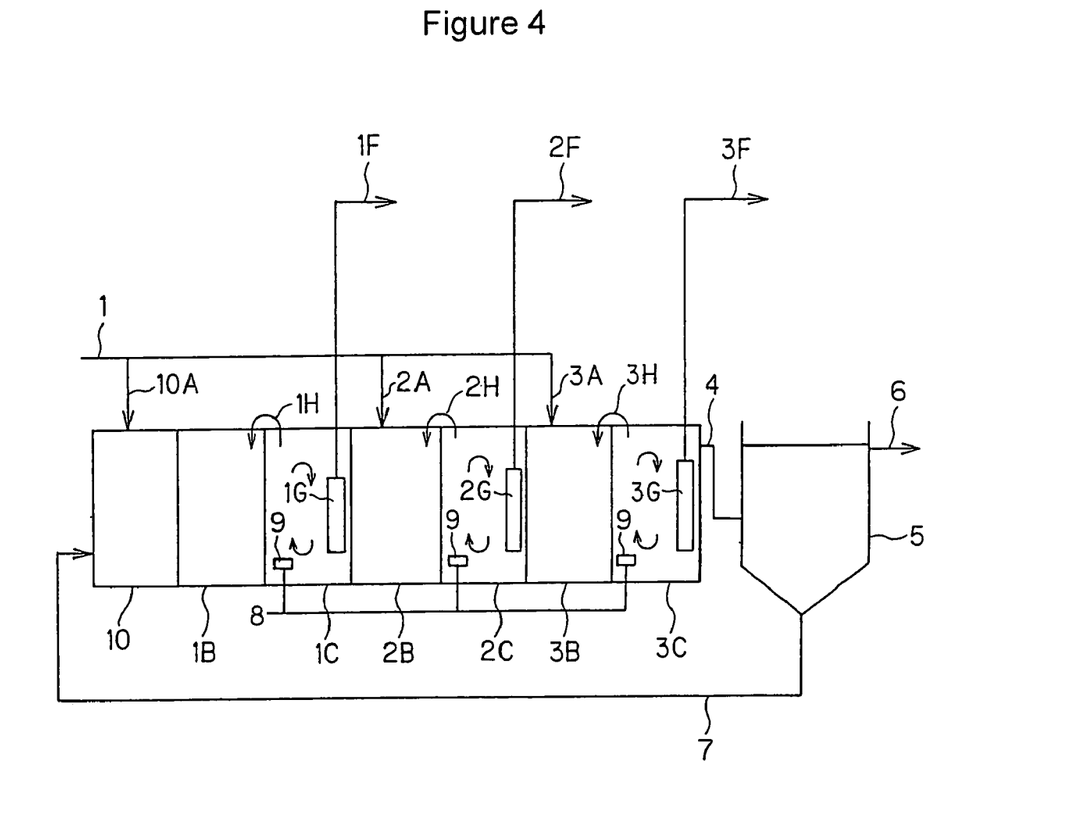
FIG. 4 is a conceptual illustration of a system for organic wastewater treatment according to yet another embodiment of the present invention.

In a case where raw feed water has a high phosphorus content and further requires biological phosphorous removal treatment, an anaerobic tank may be newly provided upstream of the first denitrification tank, and return sludge may be supplied to the anaerobic tank together with a part of raw feed water. Such a configuration allows removal of phosphorus contained in raw water. FIGS. 3 and 4 each show a configuration example of a system which further comprises an anaerobic tank newly provided upstream of the first denitrification tank.

The system shown in FIG. 3 has the same configuration as shown in FIG. 1, except that an anaerobic tank 10 is newly provided upstream of the first denitrification tank 1B. In this case, the return sludge from the final sedimentation tank 5 is supplied to the anaerobic tank 10. Raw water 1 is also distributed to the anaerobic tank 10 through a branch pipe 10A. In the system shown in FIG. 3, it should be noted that raw water 1 is not distributed to the first denitrification tank 1B. Likewise, the system shown in FIG. 4 has the same configuration as shown in FIG. 2, except that an anaerobic tank 10 is newly provided upstream of the first denitrification tank 1B.

The present invention will be further described in the following examples, which are not intended to limit the scope of the invention.

EXAMPLE 1

Housing complex sewage was treated using the organic wastewater treatment system shown in FIG. 1.

Table 1 shows the treatment conditions used in this example.

Raw water was distributed at 5 m$^3$/d to the first to third denitrification tanks 1B, 2B and 3B, respectively. The volume of circulating sludge supplied from each solid-liquid separation tank to the corresponding denitrification tank was set to 15 m$^3$/d. The volume of filtered water obtained from the first to third solid-liquid separation tanks 1D, 2D and 3D was set to 4 m$^3$/d, 4.5 m$^3$/d and 5 m$^3$/d, respectively. Return sludge was returned at 2 m$^3$/d from the sedimentation tank 5 to the first denitrification tank 1B. MLSS in the first denitrification and nitrification tanks was 4000 mg/L. MLSS in the second and subsequent denitrification and nitrification tanks was 3500 mg/L.

TABLE 1

Treatment conditions for denitrification and nitrification tanks in each stage

| | First denitrification and nitrification tanks | Second denitrification and nitrification tanks | Third denitrification and nitrification tanks |
|---|---|---|---|
| Introduced raw feed water (m$^3$/d) | 5 | 5 | 5 |
| Circulating sludge (m$^3$/d) | 15 | 15 | 15 |
| Filtered water (m$^3$/d) | 4 | 4.5 | 5.0 |
| Return sludge (m$^3$/d) | 2 | — | — |
| MLSS (mg/L) | 4000 | 3500 | 3500 |

In this example, three sheets of a water-permeable planar filter (effective filtration area: 0.6 m$^2$/sheet) were used as a filter module and immersed in each of the first to third solid-liquid separation tanks. The water-permeable filter used for this purpose was a polyester woven fabric having a thickness of about 0.1 mm and a pore size of 114 μm. The hydraulic head pressure during filtration was set to about 10 cm, while a cross-flow of the sludge mixed liquor on the filter surface was adjusted to have an average flow rate of 0.015 m/s. Under these conditions, a dynamic filtration layer of sludge was formed on the filter surface and provided for filtration.

Filtration operation was stopped every 2 hours for washing the dynamic filter. First, the outside of the filter was washed with air bubbles (air wash) by aeration through an air-diffusing pipe provided below the filter. Then, water was introduced into the inside of the filter for washing the inside of the filter (water backwash). Regular operation for filtration was started after water backwash, provided that during a period required for sludge discharge the resulting filtered water was not collected and returned as sludge to the denitrification tanks.

Table 2 shows treatment conditions for the solid-liquid separation tanks.

TABLE 2

Treatment conditions for each filtration/separation tank

| | |
|---|---|
| Supplied sludge (m$^3$/d) | 19 |
| Filtered water (m$^3$/d) | 4.0 to 5.0 |
| Air wash volume (Nm$^3$/m$^2$/d)* | 2.5 |
| Air wash time (min) | 3 |
| Water backwash volume (m$^3$/m$^2$/d)** | 40 |
| Water backwash time (min) | 0.5 |
| Sludge discharge time (min) | 3 |
| Filtration/washing interval | Once every 2.0 h |

Figure 5:
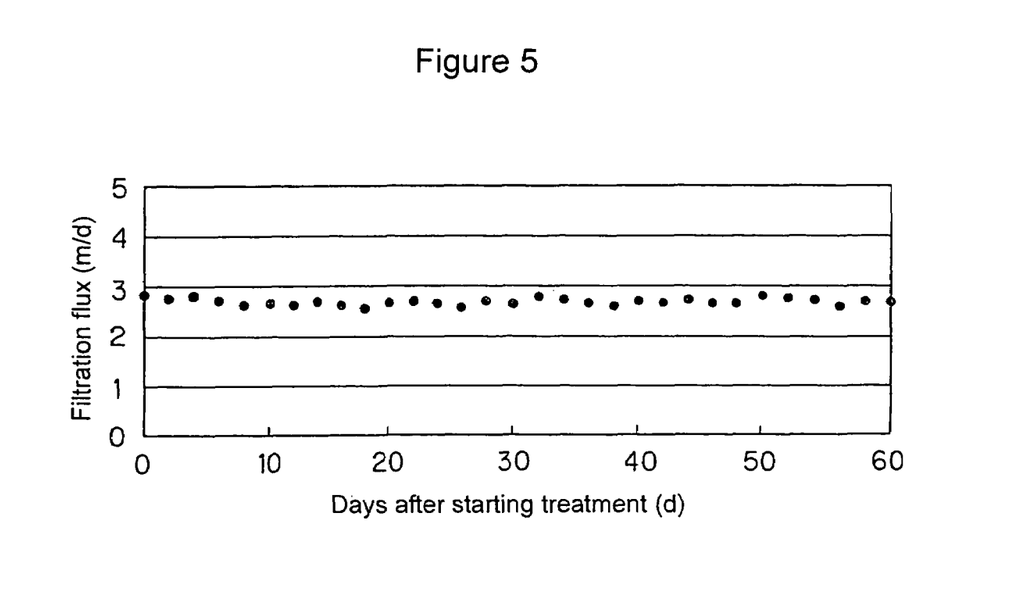
FIG. 5 is a graph showing the time course of filtration flux averaged over the solid-liquid separation tanks used in one example of the present invention.

*air volume (Nm$^3$) supplied per day and per projected area (m$^2$) of the solid-liquid separation tank
water volume (m$^3$) supplied per day and per projected area (m$^2$) of the filter FIG. 5** shows the time course of filtration flux averaged over the first to third solid-liquid separation tanks in this example.

During about 2 months after starting the treatment, the filtration flux was almost maintained at 2.7 m/d, indicating that the system ensured stable treatment.

In addition, Table 3 shows the average quality of raw water and total treated water. As used herein, the "average quality of total treated water" is intended to mean the quality averaged over the filtered water obtained from all the solid-liquid separation tanks and the effluent obtained from the sedimentation tank.

SS in the raw feed water was 120 mg/L, whereas SS in the total treated water was 5.6 mg/L.

On the other hand, $NH_4$—N in the raw feed water was 45 mg/L, whereas $NH_4$—N in the total treated water was reduced to 0.5 mg/L after nitrification/denitrification treatment, indicating that the system ensured almost complete nitrification. $NO_x$—N in the total treated water was 5.0 mg/L. T-N was 62 mg/L in the raw water, whereas it was reduced to 7.5 mg/L in the total treated water, indicating that the system achieved about 88% removal of nitrogen.

TABLE 3

Quality of raw water and total treated water

|  | Raw water | Total treated water |
|---|---|---|
| pH | 7.1 | 7.3 |
| SS (mg/L) | 120 | 5.6 |
| BOD (mg/L) | 230 | ≦5 |
| $NH_4$—N (mg/L) | 45 | 0.5 |
| $NO_x$—N (mg/L) | ND | 5.0 |
| T-N (mg/L) | 62 | 7.5 |
| T-P (mg/L) | 5.0 | 3.5 |

EXAMPLE 2

Housing complex sewage was treated using the organic wastewater treatment system shown in FIG. 3.

Table 4 shows the treatment conditions used in this example.

Raw water was distributed at 5 m³/d to the anaerobic tank 10 as well as the second and third denitrification tanks 2B and 3B, respectively. The volume of circulating sludge supplied from each solid-liquid separation tank to the corresponding denitrification tank was set to 15 m³/d. The volume of filtered water obtained from the first to third solid-liquid separation tanks 1D, 2D and 3D was set to 4 m³/d, 4.5 m³/d and 5 m³/d, respectively. Return sludge was returned at 2 m³/d from the sedimentation tank 5 to the anaerobic tank 10. MLSS of the mixed liquor in the anaerobic tank 10 was 4000 mg/L. MLSS in the second and subsequent denitrification and nitrification tanks was 3500 mg/L.

TABLE 4

Treatment conditions for anaerobic tank and denitrification and nitrification tanks

|  | anaerobic tank | First denitrification and nitrification tanks | Second denitrification and nitrification tanks | Third denitrification and nitrification tanks |
|---|---|---|---|---|
| Introduced raw feed water (m³/d) | 5 | — | 5 | 5 |
| Circulating sludge (m³/d) | — | 15 | 15 | 15 |
| Filtered water (m³/d) | — | 4 | 4.5 | 5.0 |
| Return sludge (m³/d) | 2 | — | — | — |
| MLSS (mg/L) | 4000 | 4000 | 3500 | 3500 |

In this example, three sheets of a water-permeable planar filter (effective filtration area: 0.6 m²/sheet) were used as a filter module and immersed in each of the first to third solid-liquid separation tanks. The water-permeable filter used for this purpose was a polyester woven fabric having a thickness of about 0.1 mm and a pore size of 114 µm. The hydraulic head pressure during filtration was set to about 10 cm, while a cross-flow of the sludge mixed liquor on the filter surface was adjusted to have an average flow rate of 0.015 m/s. Under these conditions, a dynamic filtration layer of sludge was formed on the filter surface and provided for filtration.

Filtration operation was stopped every 2 hours for washing the dynamic filter. First, the outside of the filter was washed with air bubbles (air wash) by aeration through an air-diffusing pipe provided below the filter. Then, water was introduced into the inside of the filter for washing the inside of the filter (water backwash). Regular operation for filtration was started after water backwash, provided that during a period required for sludge discharge the resulting filtered water was not collected and returned as sludge to the denitrification tanks.

Table 5 shows treatment conditions for the solid-liquid separation tanks.

TABLE 5

Treatment conditions for each filtration/separation tank

| Supplied sludge (m³/d) | 19 |
|---|---|
| Filtered water (m³/d) | 4.0 to 5.0 |
| Air wash volume (Nm³/m²/d)* | 2.5 |
| Air wash time (min) | 3 |
| Water backwash volume (m³/m²/d)** | 40 |
| Water backwash time (min) | 0.5 |
| Sludge discharge time (min) | 3 |
| Filtration/washing interval | Once every 2.0 h |

*air volume (Nm³) supplied per day and per projected area (m²) of the solid-liquid separation tank
**water volume (m³) supplied per day and per projected area (m²) of the filter During about 2 months after starting the treatment, the filtration flux was almost maintained at 2.7 m/d, indicating that the system ensured stable treatment.

In addition, Table 6 shows the average quality of raw water and total treated water. As used herein, the "average quality of total treated water" is intended to mean the quality averaged over the filtered water obtained from all the solid-liquid separation tanks and the effluent obtained from the sedimentation tank.

SS in the raw feed water was 120 mg/L, whereas SS in the total treated water was 6.5 mg/L. As a result of using the anaerobic tank 10, which allowed growth of polyphosphate-accumulating organisms, T-P (total phosphorus) was reduced to 0.8 mg/L in the total treated water as compared to 4 mg/L in the raw water. Also, the anaerobic tank 10 was found to have a phosphorus ($PO_4$—P) content of 25 mg/L due to the presence of polyphosphate-accumulating organisms.

On the other hand, $NH_4$—N in the raw feed water was 45 mg/L, whereas $NH_4$—N in the total treated water was reduced to 0.5 mg/L after nitrification/denitrification treatment, indicating that the system ensured almost complete nitrification. $NO_x$—N in the total treated water was 5.0 mg/L. T-N was 62 mg/L in the raw water, whereas it was reduced to 7.5 mg/L in the total treated water, indicating that the system achieved about 88% removal of nitrogen.

TABLE 6

Quality of raw water and total treated water

|  | Raw water | Total treated water |
|---|---|---|
| pH | 7.1 | 7.3 |
| SS (mg/L) | 120 | 6.5 |
| BOD (mg/L) | 230 | ≦5 |
| $NH_4$—N (mg/L) | 45 | 0.5 |
| $NO_x$—N (mg/L) | ND | 5.0 |
| T-N (mg/L) | 62 | 7.5 |
| T-P (mg/L) | 5.0 | 3.5 |
| T-P (mg/L) | 4 | 0.8 |

INDUSTRIAL APPLICABILITY

According to the present invention, in a system comprising a multistage treatment tank having at least two stages in series, each stage comprising a denitrification tank and a nitrification tank connected in this order, the sludge concentration in the denitrification tanks can be maintained at a high level by distributing feed water to the denitrification tank in each stage and returning an activated sludge mixed liquor in the nitrification tank to the denitrification tank after being concentrated by filtration and separation. In addition, it is possible to achieve a significantly reduced level of $NO_x$—N in treated water and improved removal of T-N by supplying $NO_x$—N in the nitrified fluid to the denitrification tank and reducing it to $N_2$ by the action of denitrifying bacteria present in the denitrification tank.

In addition, since the concentrated sludge mixed liquor is obtained by filtration and separation of the filtered sludge mixed liquor to remove treated water before being supplied to the denitrification tank, the concentrated sludge mixed liquor supplied to the denitrification tank has an extremely low level of dissolved oxygen. Even if this sludge mixed liquor is returned to the denitrification tank, the risk of reduced denitrification performance due to dissolved oxygen is very small.

Further, in one embodiment of the present invention where an activated sludge mixed liquor in the nitrification tank is supplied to a solid-liquid separation tank having a filtration means immersed therein, treated water of good quality can be stably obtained with a constant volume of filtered water even if there are variations in the volume and quality of raw feed water and changes in the properties of activated sludge particles.

Furthermore, in a preferred embodiment of the present invention where a sedimentation tank is further provided downstream of the final nitrification tank, such a configuration ensures solid-liquid separation in the sedimentation tank even if variations in the volume and quality of raw water lead to a reduction in the volume of filtered water. Moreover, since the major part of treated water is discharged as filtered water with the aid of each filtration means, a small volume of feed water enters the sedimentation tank and results in a high concentration of return sludge. It is therefore possible to maintain a higher level of MLSS in the denitrification tanks and to achieve higher denitrification performance if such highly concentrated sludge is returned to the denitrification tanks.

The denitrification and nitrification tanks in each stage are designed to ensure that the sludge mixed liquor in the nitrification tank is filtered through the filtration means to discharge filtered water from the system; hence they are significantly advantageous in maintaining a high level of MLSS in the tanks, in ensuring high removal of nitrogen, and in treating a larger volume of water.

The invention claimed is:

1. A system for treating organic wastewater, said system comprising:
   a multistage treatment tank having at least two stages in series, each stage comprising a denitrification tank and a nitrification tank connected in this order;
   a pipe for distributing feed water to the denitrification tank in each stage;
   a means for filtering and separating at least a part of an activated sludge mixed liquor in at least one nitrification tank, wherein the filtration and separation means is a dynamic filter comprising a water-permeable filtration layer support material for forming a dynamic filtration layer thereon, and wherein the filtration and separation means is placed in the nitrification tank;
   a pipe for supplying at least a part of the concentrated sludge mixed liquor obtained by the filtration and separation treatment to the denitrification tank in the same stage;
   a pipe for taking out of a filtered water obtained by the filtration and separation treatment from the filtration and separation means;
   a sedimentation tank to be used for solid-liquid separation of at least a part of the activated sludge mixed liquor introduced from the nitrification tank in the final stage of the multi stage treatment tank; and
   a pipe for returning the deposited sludge collected from the sedimentation tank to the denitrification tank in the first stage.

2. The system for treating organic wastewater according to claim 1, wherein the water-permeable filtration layer support material is composed of at least one member selected from the group consisting of a woven fabric material, a nonwoven fabric material and a metallic net material.

3. A system for treating organic wastewater, said system comprising:
   a multistage treatment tank having at least two stages in series, each stage comprising a denitrification tank and a nitrification tank connected in this order;
   a pipe for distributing feed water to the denitrification tank in each stage;
   a means for filtering and separating at least a part of an activated sludge mixed liquor in at least one nitrification tank, wherein the filtration and separation means is a dynamic filter comprising a water-permeable filtration layer support material for forming a dynamic filtration layer thereon;
   a solid-liquid separation tank being supplied with an activated sludge mixed liquor from at least one nitrification tank, wherein the filtration and separation means is placed in the solid-liquid separation tank;
   a pipe for supplying at least a part of the concentrated sludge mixed liquor obtained by said filtration and separation treatment to the denitrification tank in the same stage;
   a pipe for taking out of a filtered water obtained by the filtration and separation treatment from the filtration and separation means;
   a sedimentation tank to be used for solid-liquid separation of at least a part of the activated sludge mixed liquor introduced from the nitrification tank in the final stage of the multi stage treatment tank; and
   a pipe for returning the deposited sludge collected from the sedimentation tank to the denitrification tank in the first stage.

4. The system for treating organic wastewater according to claim 3, wherein the water-permeable filtration layer support material is composed of at least one member selected from the group consisting of a woven fabric material, a nonwoven fabric material and a metallic net material.

5. A system for treating organic wastewater, said system comprising:
   a multistage treatment tank having at least two stages in series, each stage comprising a denitrification tank and a nitrification tank connected in this order;
   an anaerobic tank connected upstream of the denitrification tank in the first stage; and
   a pipe for distributing feed water to the anaerobic tank and the denitrification tank in each stage other than the first stage;
   a means for filtering and separating at least a part of an activated sludge mixed liquor in at least one nitrification tank, wherein the filtration and separation means is a dynamic filter comprising a water-permeable filtration layer support material for forming a dynamic filtration layer thereon, and wherein the filtration and separation means is placed in the nitrification tank;
   a pipe for supplying at least a part of the concentrated sludge mixed liquor obtained by the filtration and separation treatment to the denitrification tank in the same stage;
   a pipe for taking out of a filtered water obtained by the filtration and separation treatment from the filtration and separation means;
   a sedimentation tank to be used for solid-liquid separation of at least a part of the activated sludge mixed liquor introduced from the nitrification tank in the final stage of the multi stage treatment tank; and
   a pipe for returning the deposited sludge collected from the sedimentation tank to the anaerobic tank.

6. The system for treating organic wastewater according to claim 5, wherein the water-permeable filtration layer support material is composed of at least one member selected from the group consisting of a woven fabric material, a nonwoven fabric material and a metallic net material.

7. A system for treating organic wastewater, said system comprising:
   a multistage treatment tank having at least two stages in series, each stage comprising a denitrification tank and a nitrification tank connected in this order;
   an anaerobic tank connected upstream of the denitrification tank in the first stage;
   a pipe for distributing feed water to the denitrification tank in each stage;
   a means for filtering and separating at least a part of an activated sludge mixed liquor in at least one nitrification tank, wherein the filtration and separation means is a dynamic filter comprising a water-permeable filtration layer support material for forming a dynamic filtration layer thereon;
   a solid-liquid separation tank being supplied with an activated sludge mixed liquor from at least one nitrification tank, wherein the filtration and separation means is placed in the solid-liquid separation tank;
   a pipe for supplying at least a part of the concentrated sludge mixed liquor obtained by said filtration and separation treatment to the denitrification tank in the same stage;
   a pipe for taking out of a filtered water obtained by the filtration and separation treatment from the filtration and separation means;
   a sedimentation tank to be used for solid-liquid separation of at least a part of the activated sludge mixed liquor introduced from the nitrification tank in the final stage of the multi stage treatment tank; and
   a pipe for returning the deposited sludge collected from the sedimentation tank to the anaerobic tank.

8. The system for treating organic wastewater according to claim 7, wherein the water-permeable filtration layer support material is composed of at least one member selected from the group consisting of a woven fabric material, a nonwoven fabric material and a metallic net material.

9. The system for treating organic wastewater according to claim 7, further comprising a pipe for distributing feed water to the anaerobic tank.

10. A method for treating organic wastewater in an organic wastewater treatment system comprising a multistage treatment tank having at least two stages in series, each stage comprising a denitrification tank and a nitrification tank connected in this order, and a sedimentation tank, said method comprising:
    distributing feed water to the denitrification tank in each stage;
    filtering and separating at least a part of an activated sludge mixed liquor in at least one nitrification tank, wherein the filtration and separation treatment is accomplished with a filtration and separation means placed in the nitrification tank, and wherein the filtration and separation means is a dynamic filter comprising a water-permeable filtration layer support material for forming a dynamic filtration layer thereon;
    supplying at least a part of the concentrated sludge mixed liquor obtained by the filtration and separation treatment to the denitrification tank in the same stage;
    taking out a filtered water obtained by the filtration and separation treatment from the filtration and separation means;
    supplying at least a part of the activated sludge mixed liquor in the nitrification tank in the final stage to the sedimentation tank for solid-liquid separation; and
    returning deposited sludge collected from the sedimentation tank to the denitrification tank in the first stage.

11. The method for treating organic wastewater according to claim 10, wherein the water-permeable filtration layer support material is composed of at least one member selected from the group consisting of a woven fabric material, a nonwoven fabric material and a metallic net material.

12. A method for treating organic wastewater in an organic wastewater treatment system comprising a multistage treatment tank having at least two stages in series, each stage comprising a denitrification tank and a nitrification tank connected in this order, and a sedimentation tank, said method comprising:
    distributing feed water to the denitrification tank in each stage;
    filtering and separating at least a part of an activated sludge mixed liquor in at least one nitrification tank, wherein the filtration and separation treatment of the activated sludge mixed liquor is accomplished by supplying at least a part of the activated sludge mixed liquor in at least one nitrification tank to a solid-liquid separation tank having a filtration and separation means placed therein, and wherein the filtration and separation means is a dynamic filter comprising a water-permeable filtration layer support material for forming a dynamic filtration layer thereon;

supplying at least a part of the concentrated sludge mixed liquor obtained by the filtration and separation treatment to the denitrification tank in the same stage;

taking out a filtered water obtained by the filtration and separation treatment from the filtration and separation means;

supplying at least a part of the activated sludge mixed liquor in the nitrification tank in the final stage to the sedimentation tank for solid-liquid separation; and returning deposited sludge collected from the sedimentation tank to the denitrification tank in the first stage.

13. The method for treating organic wastewater according to claim 12, wherein the water-permeable filtration layer support material is composed of at least one member selected from the group consisting of a woven fabric material, a nonwoven fabric material and a metallic net material.

14. A method for treating organic wastewater in an organic wastewater treatment system comprising a multi-stage treatment tank having at least two stages in series, each stage comprising a denitrification tank and a nitrification tank connected in this order, a sedimentation tank, and an anaerobic tank connected upstream of the denitrification tank in the first stage, said method comprising:

distributing feed water to the anaerobic tank and the denitrification tank in each stage other than the first stage;

filtering and separating at least a part of an activated sludge mixed liquor in at least one nitrification tank, wherein the filtration and separation treatment is accomplished with a filtration and separation means placed in the nitrification tank, and wherein the filtration and separation means is a dynamic filter comprising a water-permeable filtration layer support material for forming a dynamic filtration layer thereon;

supplying at least a part of the concentrated sludge mixed liquor obtained by said filtration and separation treatment to the denitrification tank in the same stage;

taking out a filtered water obtained by the filtration and separation treatment from the filtration and separation means;

supplying at least a part of the activated sludge mixed liquor in the nitrification tank in the final stage to the sedimentation tank for solid-liquid separation; and returning deposited sludge collected from the sedimentation tank to the anaerobic tank.

15. The method for treating organic wastewater according to claim 14, wherein the water-permeable filtration layer support material is composed of at least one member selected from the group consisting of a woven fabric material, a nonwoven fabric material and a metallic net material.

16. A method for treating organic wastewater in an organic wastewater treatment system comprising a multi-stage treatment tank having at least two stages in series, each stage comprising a denitrification tank and a nitrification tank connected in this order, a sedimentation tank, and an anaerobic tank connected upstream of the denitrification tank in the first stage, said method comprising:

distributing feed water to the denitrification tank in each stage;

filtering and separating at least a part of an activated sludge mixed liquor in at least one nitrification tank, wherein the filtration and separation treatment of the activated sludge mixed liquor is accomplished by supplying at least a part of the activated sludge mixed liquor in at least one nitrification tank to a solid-liquid separation tank having a filtration and separation means placed therein, and wherein the filtration and separation means is a dynamic filter comprising a water-permeable filtration layer support material for forming a dynamic filtration layer thereon;

supplying at least a part of the concentrated sludge mixed liquor obtained by said filtration and separation treatment to the denitrification tank in the same stage;

taking out of a filtered water obtained by the filtration and separation treatment from the filtration and separation means;

supplying at least a part of the activated sludge mixed liquor in the nitrification tank in the final stage to the sedimentation tank for solid-liquid separation; and returning deposited sludge collected from the sedimentation tank to the anaerobic tank.

17. The method for treating organic wastewater according to claim 16, wherein the water-permeable filtration layer support material is composed of at least one member selected from the group consisting of a woven fabric material, a nonwoven fabric material and a metallic net material.

18. The method for treating organic wastewater according to claim 16, further comprising distributing feed water to the anaerobic tank.

* * * * *